Z. G. SHOLES.
SOAP CUTTING MACHINE.
APPLICATION FILED DEC. 10, 1906.
957,446.
Patented May 10, 1910.
2 SHEETS—SHEET 2.
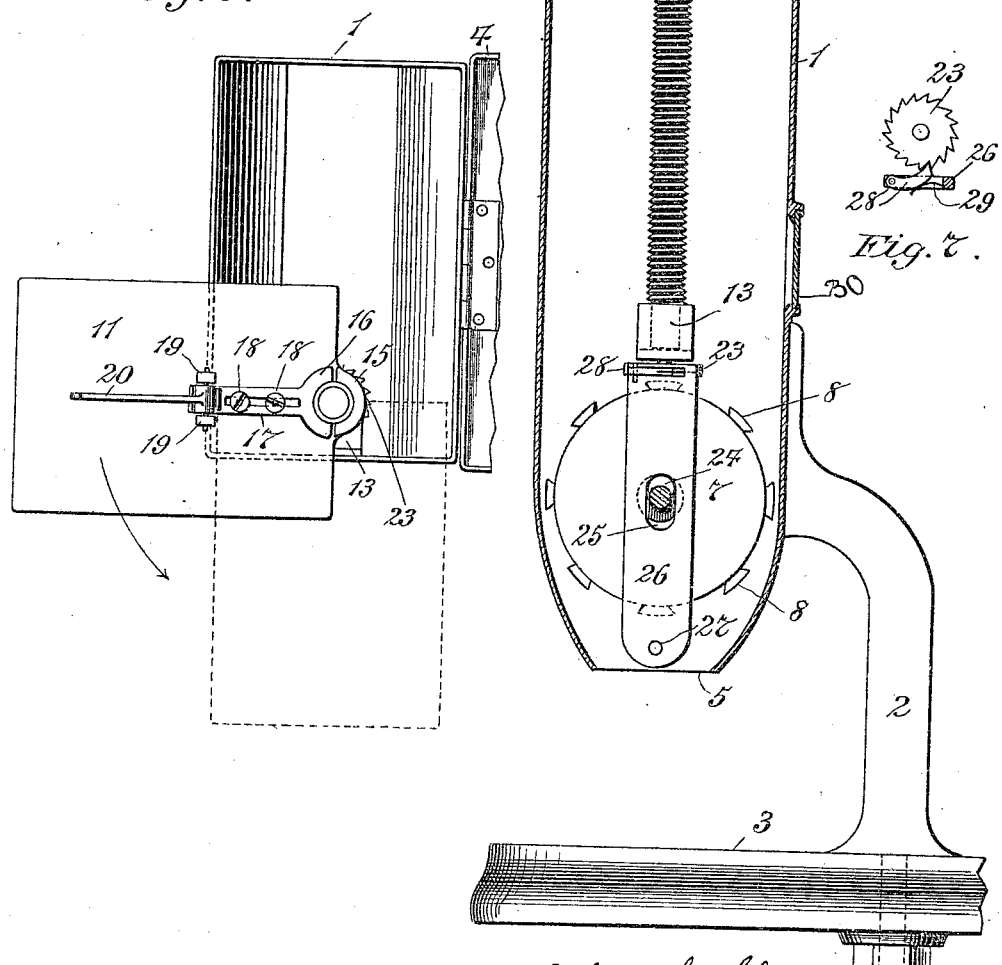

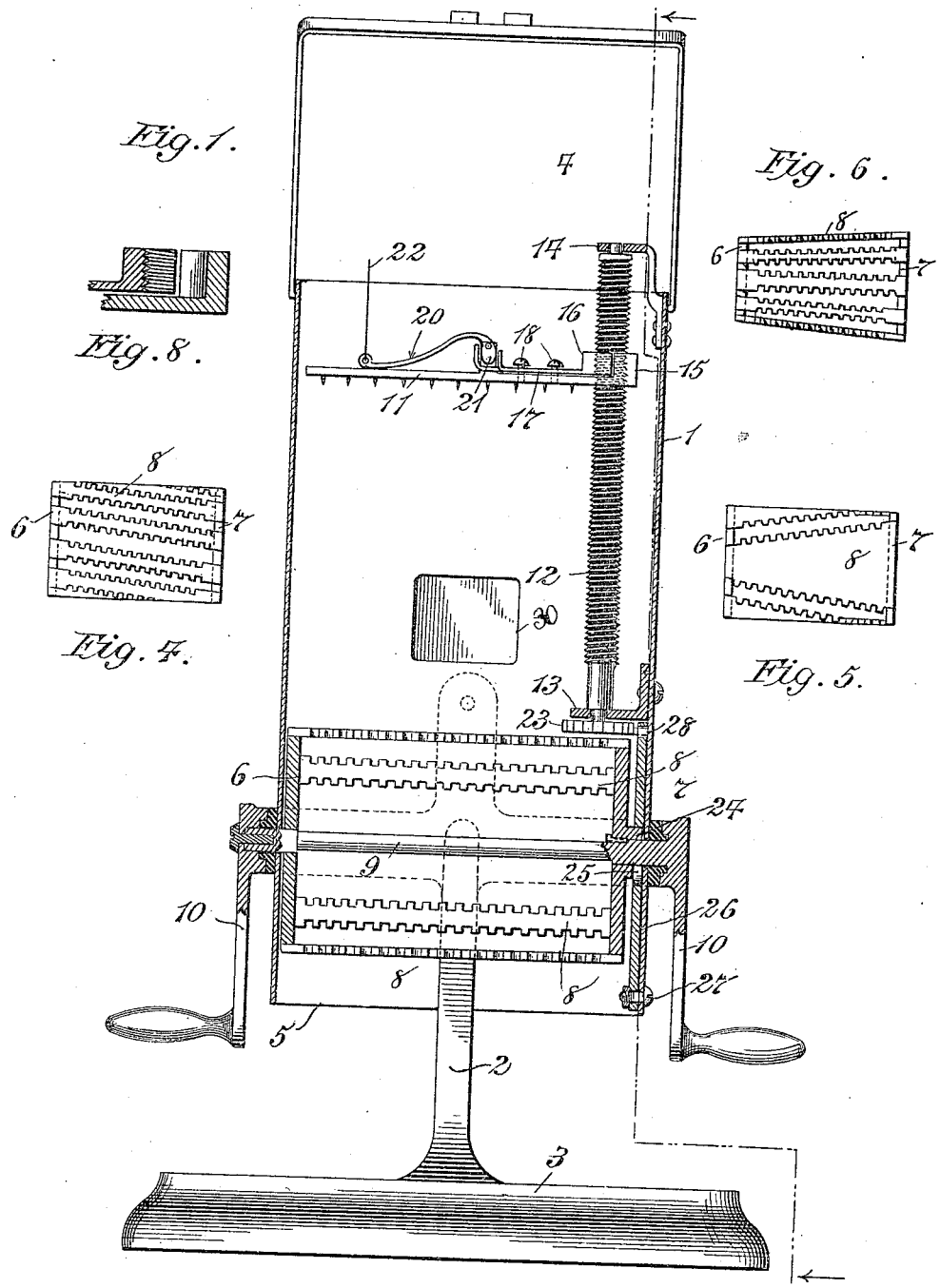

UNITED STATES PATENT OFFICE.

ZALMON G. SHOLES, OF NEW YORK, N. Y., ASSIGNOR TO WEST DISINFECTING COMPANY, A CORPORATION OF NEW YORK.

SOAP-CUTTING MACHINE.

957,446.

Specification of Letters Patent.

Patented May 10, 1910.

Application filed December 10, 1906. Serial No. 347,212.

*To all whom it may concern:*

Be it known that I, ZALMON G. SHOLES, a citizen of the United States, residing in the city, county, and State of New York, have invented a certain new and useful Improvement in Soap-Cutting Machines, of which the following is a specification.

This invention relates to an improved form of soap distributing machine intended to be placed upon washstands, particularly in hotels, railway stations and in other public places.

The object of the invention is the provision of a special improved drive, acting to properly operate the feed screw which feeds the soap forward, in whichever direction the handle may be turned.

Certain preferred forms of my invention are illustrated in the accompanying drawings, wherein—

Figure 1 is a front elevation of my device in section with the front removed, partly in section with the front removed, Fig. 2 is a side elevation thereof with the side removed, Fig. 3 is a plan view with the cutters and a part of the cover removed, Figs. 4, 5 and 6 illustrate modified forms of cutters, Fig. 7 is a detail of the pawl and ratchet drive, and Fig. 8 is a sectional view of a modification of the separable nut.

The soap receptacle consists preferably of a generally rectangular upright metal casing, 1, supported in any desired and convenient manner. In the form shown the support consists of a standard 2 rising from a base 3 and occupying a position behind the casing so as to give all possible room for the hands beneath the same. The casing is closed in any convenient manner, as by the top cover 4. The under side of the casing 1 is open as shown at 5 and above this opening there is placed a proper device for disintegrating the cake of soap, so that particles thereof may be made to fall through the opening 5 into the user's hands. This disintegrating device preferably consists of a rotary cutter which may assume a variety of forms.

In Figs. 1 and 2 is shown a cylindrical cutter consisting of end disks 6 and 7 carrying grating bars 8 which extend from disk to disk across the casing 1. These bars are preferably notched to form teeth which may be arranged in any desired way so long as they are adapted to remove the surface of a cake of soap when the same is pressed down upon the disintegrating device. A shaft 9 passes through the casing from side to side and the disks 6 and 7 are carried centrally upon said shaft. A handle 10 may be placed at either end of this shaft whereby the cutter can be turned for operation. It is one of the advantages of this device that two handles may be used as shown in Fig. 1, thus adapting the machine to left handed persons. This is made possible and convenient by the fact that turning the handles in either direction will operate the machine.

The cake of soap intended to be disintegrated is introduced into the casing 1 so as to lie upon the grating bars 8. In order to insure continued pressure of the cake upon the bars despite the wearing away of the material, means must be supplied for pushing the soap downward and for this purpose I prefer to supply a follower 11 operated automatically by revolution of the cutter itself. I prefer the form of automatic follower shown wherein a vertical screw 12 is supported at its ends in bearing brackets 13 and 14 at one side of the casing 1. A threaded nut on the follower, fits the screw 12 and this nut must be made so as to be separable at will in order to allow reverse movement of the follower when a new cake of soap is to be introduced. In the form I have shown the separable nut must be placed on top of the follower plate 11. One half of the nut, shown at 15 is fixed to said plate while the remaining portion, 16, is fixed to a movable slotted plate 17 which is guided by pins 18 so as to slide upon the top of the follower 11.

Between brackets 19 on the follower there is pivoted a lever 20 carrying a locking cam 21 at its inner end, and this cam extends downward between two uprights 22 on the sliding plate 17. When the lever 20 is lifted the split nut is opened and said nut is closed upon the screw 12 when the lever 20 is depressed as shown in the drawings. In lifting the follower to insert a new cake of soap the lever 20 is raised, by a string 22ª or otherwise, when the whole follower can be lifted along the screw 12 as a guide and can be swung around the same as a center to assume the position shown in full lines in Figs. 2 and 3, or to that shown in dotted lines in Fig. 3. When thus placed the way is clear for easy access to the interior of the casing.

In order to turn the screw 12 so as to operate the follower 11 to press the cake of soap downward, said screw is provided at its lower end with a ratchet wheel 23 having inclined teeth. An eccentric pin 24 is carried by the shaft of the cutter and passes through a slot 25 in the swinging plate 26. This plate is pivoted below the shaft 9, at 27, and carries a pawl 28 which is held in engagement with the teeth of the ratchet wheel 23 as by a spring 29. As the shaft 9 and the cutter are revolved by a handle 10, the eccentric 24 operates to swing the plate 26 on its pivot and the pawl 28 acts continually to revolve the ratchet wheel 23 and screw 12 in one direction so as to move the follower 11 slowly downward. This action takes place in whichever direction either handle 10 is turned and so if either handle be turned by mistake in a reverse direction there will be no failure of action, either at that time or later. It will be seen that the apparatus thus far described will be efficient with any cake of soap capable of being introduced into the casing 1. For this purpose it is only necessary to lift the follower and swing it outward, drop the soap into the cutter, push the follower down onto the soap, close the nut 15, 16 by depressing the lever 20 and then turn either handle 10.

Where the grating bars 8 are placed as far apart as desirable to permit the comminuted soap to fall through the cutter with certainty, the spaces which separate these bars will be wide enough to permit some small narrow cakes to slip through. Besides this even a large cake, when first inserted, is apt to make starting difficult by reason of an edge or corner passing into a space between two bars. To surely avoid these difficulties I have devised certain modified forms of cutters shown in Figs. 4, 5 and 6, all of which are within my invention.

In Fig. 4 the cutter shown is cylindrical as a whole but the individual bars are set slantingly, so that the narrow spaces between them form an angle with the edge of a cake of soap set squarely into the casing. Thus even a thin cake could not find its way into one of these spaces. The same object is attained by making each bar with converging cutting edges, as shown in Fig. 5 and setting the bars so that, while the spaces between them have generally parallel sides the direction of each space is at an angle with the edge of a cake of soap set squarely in the casing 1.

In Fig. 6 I show a cutter which is slightly conical as a whole, the end disk 7 being of greater diameter than the disk 6. By use of such a cutter only one corner of the cake is acted upon at first and the initial resistance to operation diminished.

In Fig. 8 is shown a preferred modification of the separable nut used upon my follower. This is a sectional view passing through the center of the nut and through both the fixed and the movable parts thereof. It will be seen that the fixed portion 15 is smooth while the threads are upon the movable part alone. This permits the follower to slide easily up and down on the screw 12 as a guide.

The follower 11 is shown provided with teeth so as to hold the soap the more securely and prevent its rattling within the casing.

As shown in Fig. 1, the lower end of the screw 12 is smooth for some distance from the lower end. This is to insure stoppage of the follower before the same descends sufficiently far to permit the teeth to strike the grating bars.

The window shown at 30 permits the user to see when the soap is giving out so as to obviate the necessity of opening the casing to determine when to put in a new cake.

What I claim is—

A device of the class described comprising a casing, a rotary cutter near one end thereof, a longitudinal threaded bar having a ratchet wheel on one end, a swinging slotted plate pivoted near said cutter, an eccentric carried by the cutter shaft and entering the slot in said plate, a ratchet on said plate engaging said ratchet wheel and a follower operated by said screw, substantially as described.

ZALMON G. SHOLES.

Witnesses:
H. S. MacKaye,
Mabel Stevens.